INVENTOR
JOHN G. LAWTON.
DITMAR H. BOCK.

BY

ATTORNEY

United States Patent Office 3,551,795
Patented Dec. 29, 1970

3,551,795
TRANSCEIVER APPARATUS FOR GENERATING AND RESPONDING TO AN ALTERNATING MAGNETIC FIELD
Ditmar H. Bock, Cheektowaga, and John G. Lawton, Snyder, N.Y., assignors to Cornell Aeronautical Laboratory, Inc., Buffalo, N.Y., a corporation of New York
Filed Apr. 10, 1968, Ser. No. 720,250
Int. Cl. H04b 1/16, 1/38
U.S. Cl. 324—3                                    7 Claims

ABSTRACT OF THE DISCLOSURE

A transceiver unit applicable to the location of lost or buried objects, having a signal transmitting and receiving loop, the reception stage of which contains a high gain amplifier, a tuned amplifier and an output amplifier. The high gain amplifier has a volume control arranged in such a manner that the amplifier noise increases as the volume is increased. An earphone is connected across the output amplifier to increase the dynamic range.

BACKGROUND OF THE INVENTION

The present invention relates to rescue beacons and, more particularly, to a rescue beacon that can be utilized to locate avalanche victims.

The devices presently available to locate avalanche victims can be classified as either manual or automatic. Among the manual devices are metal probes which are about twelve feet long. In use, a line of searchers standing shoulder to shoulder, each equipped with a probe, push their probes into the avalanche as far as they will go. The amount by which the tips of the probes protrude is then compared and all unusual discontinuities are investigated by digging. Probes are inserted three times for each step forward, at the right foot, between the feet, and at the left foot. This is exhausting work, especially when performed at high altitudes, and progress is exasperatingly slow. As should be apparent, the probe technique is crude, time consuming and subject to many false alarms.

Automatic devices have been proposed that are based on the use of radioactive material, magnets and metal detectors. None of these have proved practical for various reasons, among which the following appear to predominate:

(1) The sensing devices needed, e.g., Geiger counters, magnetometers, mine detectors, are expensive and not generally available;

(2) The range of the sender-detector combination is too limited; and (3) The sender cannot be tuned off; thus, if the members of the search party are similarly equipped, their senders will jam the sensing devices.

SUMMARY OF THE INVENTION

The foregoing, and other disadvantages of the prior art are overcome according to the present invention which provides, a simple, compact, inexpensive and reliable rescue beacon that may be utilized to locate buried avalanche victims.

The rescue beacon according to the present invention comprises a battery powered pocket-sized transceiver unit and means removably associated therewith to generate or receive an alternating magnetic field dependent upon whether such means is connected in the transmit or receive mode. An avalanche victim would have his unit in the transmit mode whereas the members of a search party would have their units in the receive mode to pick up signals emanating from the transmitter and, according to the strength thereof, home in on the victim.

In a device of this type, it is important that any potential searcher be qualified to operate the beacon correctly regardless of his prior experience with communication equipment. The device must be foolproof. This requirement is adequately satisfied by the present device which provides a variable noise signal in the receiver that indicates to the searcher the direction to turn the volume control knob for increasing or decreasing the sensitivity of the unit. Thus, as this noise signal increases the searcher will know that the receiver amplifier is also increased to increase the sensitivity of the receiver.

Since the beacon according to the present invention uses an alternating magnetic field the components of which decrease as the inverse cube power of range, the signal drops off very rapidly with range and will not cause interference to any other remotely located receivers. Also within the operational range of the beacons, the signals will change at a greater rate to better locate the avalanche victim than would be the case with a radio beacon.

The beacon according to the present invention further comprises means coupling the receiver to an earphone in such a manner as to achieve a dynamic range that extends beyond the saturation point of the receiver output amplifier.

It is accordingly an object of the present invention to provide an inductive rescue beacon, comprising; oscillator means for generating a substantially constant frequency signal, means adapted to be connected to said oscillator means for developing an alternating magnetic field in response to said signal, a receiver comprising amplifier means responsive to a signal similar to said first mentioned signal, and said second mentioned means adapted to be connected to said receiver for responding to an alternating magnetic field that is similar to said first mentioned field.

BRIEF DESCRIPTION OF THE DRAWINGS

For a more fuller understanding of the present invention, reference may now be had to the following description thereof taken in conjunction with the accompanying drawings, wherein.

DESCRIPTION OF THE PREFERRED EMBODIMENTS

Figure 1:
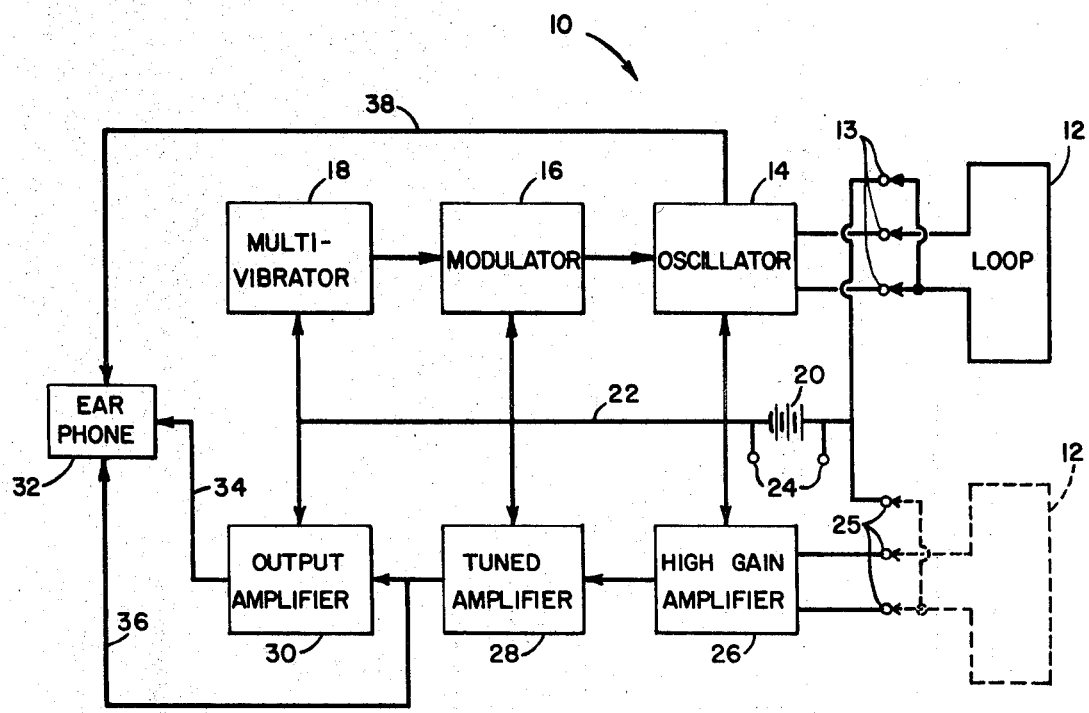
FIG. 1 is a block diagram of the transceiver unit of the present invention.

Referring now to the drawings, and more particularly to FIG. 1, the transceiver of the present invention is generally indicated by numeral 10 and comprises transmitting and receiving subassemblies.

An induction loop 12, when connected in the transmit mode, is adapted to transmit a pulsed, substantially constant signal, preferably in the audible range. Loop 12 may be an 18-inch, 20-gauge wire induction coil that can be carried by the buried skier. The loop is preferably electrostatically shielded, as is conventional. Alternatively, a ferrite or laminated core may be employed. As shown, loop 12 is plugged into transmitter receptacles 13.

The signal is developed by an oscillator 14, which may typically be a base modulated Hartley oscillator that is modulated by a suitable modulator 16, such as a common emitter amplifier. To obtain the pulsed tones an asymmetric multivibrator 18 is employed to control modulator 16. While any suitable pulse interval and pulse duration may be practiced, it has been found that a pulse of 30 msec. which is received three times a second is optimum, from the standpoint of battery life and attention attracting characteristics. Thus, the transmitter would be on only 10 percent of the time.

A source of power in the form of a battery 20 is in electrical communication with the above-described components, and those to be described hereinbelow, via line 22. Battery 20 may be rechargeable and terminals 24 are provided for this purpose. It has been found that a 2.4-volt nickel cadmium battery has performed satisfactorily, lasting 200 hours in the transmit mode and 1500 hours in the receive mode, before any recharging was required.

When plugged in the receive mode terminals 25, the loop as shown in dashed lines in FIG. 1 receives signals transmitted from another identical transceiver unit with its loop in the transmit mode; one that may be carried by the buried skier or other object to be located. The signals are amplified by wide band amplifier assembly 26, to be discussed in greater detail hereinbelow. Amplifier 28 is tuned to the signal being emitted from the transmitting loop and thereby selects this signal for amplification by output amplifier 30. Amplifier 28 may be a conventional twin-T feedback amplifier and amplifier 30 may be a common emitter stage.

According to the present invention, an earphone or other suitable energy conversion means 32, which may be a high impedance crystal earphone, is connected across the output stage 30. Thus, the earphone is connected to the collector of the output stage via line 34 and the input to this stage via line 36, which is the emitter of the previous stage. In this manner when the output amplifier is saturated, the input signal can still be increased, and heard, until the previous stage 28 is saturated. Thus, if the output stage 30 has a gain of 20 db and the maximum output from the previous stage 28 is approximately equal to the maximum output from the final stage, then approximately 20 db of additional dynamic range is obtained. Although this technique results in distortion of the output whenever the final stage is saturated, this is not objectionable in the present field of application.

To verify proper operation of the transmitter, a small component of the transmitted signal is passed through the earphone via line 38 thereby developing a side tone signal.

Figure 2:
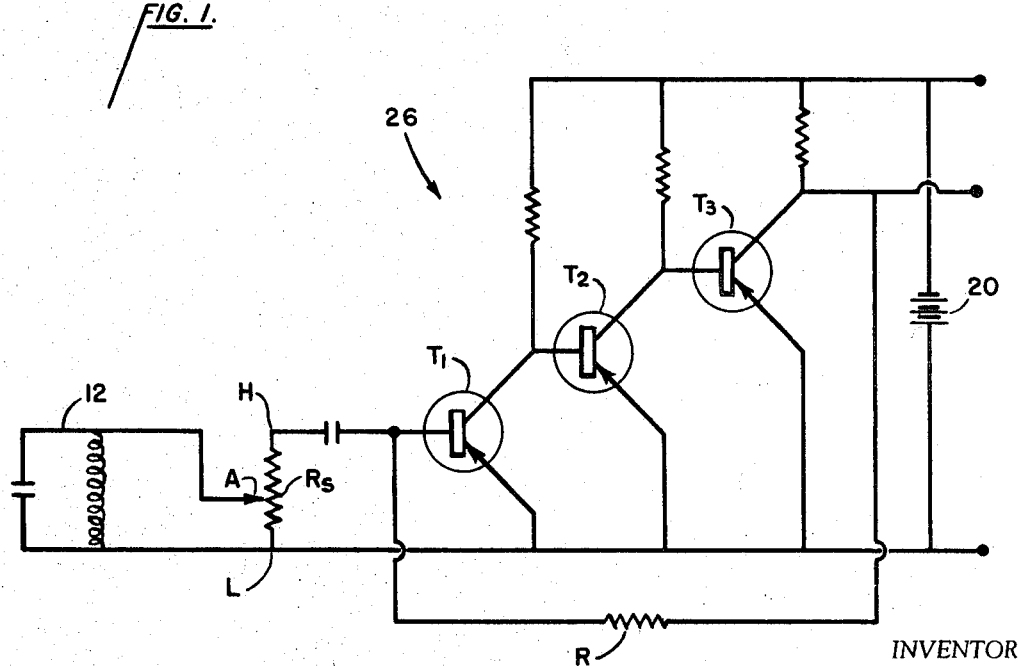
FIG. 2 is a circuit diagram of the wide band amplifier shown in FIG. 1 and illustrating the volume control thereof.

FIG. 2 illustrates the circuit diagram of the high gain amplifier assembly 26 of FIG. 1 which comprises the amplifier proper and the unique volume control thereof. As shown, the wideband amplifier proper comprises three transistors $T_1$, $T_2$, and $T_3$ that are direct coupled, and as should be apparent to one skilled in the art are arranged to function on the same principle as direct-coupled transistor logic; the opertaing point of which is stabilized by the direct current feed-back provided by R. As is conventional, suitable stabilizing means (not shown) are provided to prevent oscillations. The gain of the amplifier is sufficient that the noise of the first stage is audible.

The volume or gain control for amplifier 26 is illustrated in FIG. 2 as comprising a movable slider or arm A and a stationary resistance element $R_s$ that has high and low terminals H and L, respectively. It is important to note that the signal from loop 12 is applied between the arm A and the low side L of the element $R_s$ and the signal is withdrawn from the high side H of element $R_s$ and the low side L thereof. Arm A is connected directly to the loop 12 when the loop is plugged into the receive mode, whereas H and L are connected, respectively, to the input of wideband amplifier and ground. In this manner, the amplifier noise is a maximum when the arm A is in the high or H position and a minimum when A is in the low or L position. The significance of directly connecting the volume control arm to the source of the signal is that the intensity of the noise signal audible to the user is now indicative of the direction in which to turn the knob to increase or decrease the sensitivity of the unit. Thus, when the searcher is furthest from the object to be located, he need only turn the volume control in the direction of increasing noise to achieve maximum sensitivity, whereas when he gets closer he can reverse the direction to lower the sensitivity. Stated in another way, the source impedance of the high gain amplifier is varied to vary the negative feedback in such a manner that when the volume control is the highest, the output noise is the highest because the negative feedback is the lowest. This is to be distinguished from conventional practice wherein noise is a maximum at the high and low positions and a minimum in between.

The search technique used withe the transceiver of the present invention when used to locate a buried skier is to deploy a line of searchers spaced about 100 feet apart, across the avalanche, starting either at the bottom thereof or at the level where the victim was last seen. The searchers proceed up or down as the case may be, along the path of the avalanche. Although the reception pattern of the loop 12 is directional it cannot be used as a direction finder because the orientation of the victim's loop is unknown and the near field of a magnetic dipole contains both a radial and a tangential component. Therefore, the following procedure has been adopted.

The searchers stop and listen for signals—turn their bodies so as to avoid the signal falling into a null of the reception patterns; if no one hears the signal, the entire line moves forward approximately five steps and repeats this procedure. It has been found that weak signals can be much more readily heard when the listener is standing still than when he is in motion. When one of the searchers hears the signal he orients his body for maximum signal strength, turns the gain control down until the signal is just audible, takes a few steps, again maximizes the signal and determines whether or not the signal strength is increasing or decreasing. Once the signal is received this technique permits the searchers to proceed virtually directly to the spot under which the victim is buried. The length of time required to actually locate the victim once the signal is received is primarily determined by how difficult it is for the searcher to move over the surface of the avalanche, how dense the avalanche is, and how deeply the victim is buried.

The maximum range at which the signals from the present device can be received is approximately 300 feet. Because the field components of a magnetic dipole decrease inversely as the cube of the range, the threshold of reception is quite sharp. At 100 feet the signals are detected with very high reliability. Although there is undoubtedly some attenuation of the signal by the intervening snow, field tests have not been able to detect this for penetration of up to 100 feet of dense snow.

The present system is designed to be simple, rugged, and easy to manufacture. It consists of transistorized components and the total weight carried by a skier is 1 pound, 11 ounces and is, except for the loop, approximately the size of a pack of cigarettes.

Although the apparatus according to the present invention has been described, by way of example, as being applicable to the location of avalanche victims, it can obviously be advantageously applied to other searching situations, as for example; the location of parachute-dropped supplies, scuba diving and mining. It is therefore intended that the invention be limited only by the scope of the appended claims.

What is claimed is:
1. An inductive rescue beacon, comprising;
  (a) oscillator means for generating a substantially constant frequency signal,
  (b) second means adapted for connection to said oscillator means for developing an alternating magnetic field in response to said signal,
  (c) a receiver comprising amplifier means responsive to a signal similar to said first mentioned signal, said amplifier means comprising;
    (1) a tuned amplifier having an output,

(2) an output amplifier having an input connected to the output of said tuned amplifier, (3) a wideband amplifier having an input, adapted for connection to said second means, an output connected to the input of said tuned amplifier, a feedback impedance connected between said input and output, and control means for varying the value of the signal feedback from said output to said input from a minimum to a maximum as said control means is moved from one extreme position to another, and (d) energy conversion means having inputs connected respectively to the input of said output amplifier and the output thereof for increasing the dynamic range of said energy conversion means.

2. The beacon according to claim 1, wherein said control means is part of a volume control circuit comprising;

(i) a movable control arm adapted for direct connection to said second means, and (j) an impedance element having high and low terminals connected, respectively, to the input of said wideband amplifier and ground, said movable control arm makes variable contact with said impedance at points thereon intermediate said high and low terminals.

3. The beacon according to claim 2, wherein said wide band amplifier comprises a plurality of direct coupled transistors.

4. The beacon according to claim 3, wherein said second means comprises an induction coil loop.

5. The beacon according to claim 4, wherein said oscillator means, said second means and said receiver are powered by a rechargeable source of D.C. voltage.

6. The beacon according to claim 4, wherein said tuned amplifier is a twin-T transistor amplifier and said output is of the common emitter type.

7. The beacon according to claim 6, wherein there is further provided means for causing said oscillator to generate a pulsed signal.

References Cited

UNITED STATES PATENTS

| | | | |
|---|---|---|---|
| 1,978,514 | 10/1934 | Tarzian | 325—397 |
| 2,762,875 | 9/1956 | Fischer | 330—25X |
| 2,866,859 | 12/1958 | Stanley | 330—29UX |
| 3,132,300 | 5/1964 | Lefevre | 325—16 |
| 3,207,987 | 9/1965 | Kiryluk et al. | 325—16X |
| 3,209,081 | 9/1965 | Ducote et al. | 330—29UX |
| 3,305,779 | 2/1967 | Errichiello | 325—16X |
| 3,317,671 | 5/1967 | Mitchell et al. | 179—1 |
| 3,371,278 | 2/1968 | Gelushia et al. | 325—16X |
| 3,418,572 | 12/1968 | Humphreys Jr. | 324—67 |
| 2,820,959 | 1/1958 | Bell | 324—3X |
| 2,944,218 | 7/1960 | Newbold | 324—123UX |
| 3,311,826 | 3/1967 | Galman | 324—119X |
| 3,454,892 | 7/1969 | Knowles | 330—25X |

GERARD R. STRECKER, Primary Examiner

U.S. Cl. X.R.
325—16, 319, 398; 330—29